US011652689B2

(12) United States Patent
Power et al.

(10) Patent No.: US 11,652,689 B2
(45) Date of Patent: May 16, 2023

(54) ZERO TOUCH DEPLOYMENT AND DYNAMIC CONFIGURATION

(71) Applicant: Elo Touch Solutions, Inc., Milpitas, CA (US)

(72) Inventors: Michael James Power, San Jose, CA (US); Ragini Rajendra Prasad, Los Altos, CA (US); Haroun Ansari Mohammed Ansari, Mountain View, CA (US); Kenneth North, San Carlos, CA (US); Ahmed Zaytoun, San Jose, CA (US); Oren Lavi Stern, Santa Clara, CA (US); Praveen George, San Jose, CA (US)

(73) Assignee: ELO TOUCH SOLUTIONS, INC., Knoxville, TN (US)

( * ) Notice: Subject to any disclaimer, the term of this patent is extended or adjusted under 35 U.S.C. 154(b) by 291 days.

(21) Appl. No.: 16/394,484

(22) Filed: Apr. 25, 2019

(65) Prior Publication Data
US 2020/0344115 A1   Oct. 29, 2020

(51) Int. Cl.
*H04L 41/082* (2022.01)
*H04L 67/00* (2022.01)
*H04L 41/0869* (2022.01)
*H04L 41/08* (2022.01)

(52) U.S. Cl.
CPC ........ *H04L 41/082* (2013.01); *H04L 41/0869* (2013.01); *H04L 67/34* (2013.01); *H04L 41/0883* (2013.01); *H04L 41/0886* (2013.01)

(58) Field of Classification Search
None
See application file for complete search history.

(56) References Cited

U.S. PATENT DOCUMENTS

| | | | |
|---|---|---|---|
| 7,506,809 B2 | 3/2009 | Stoutenburg et al. | |
| 9,836,626 B1 * | 12/2017 | Edwards | G06Q 20/3226 |
| 10,304,043 B1 * | 5/2019 | Nguyen | G06Q 20/208 |
| 10,410,481 B2 | 9/2019 | Yu et al. | |
| 10,701,067 B1 * | 6/2020 | Ziraknejad | H04W 12/63 |
| 10,911,305 B2 * | 2/2021 | Mishra | H04W 12/37 |
| 10,922,414 B2 * | 2/2021 | Wipf | G06Q 20/20 |
| 2013/0005352 A1 * | 1/2013 | Jones | G07B 15/00 455/456.1 |
| 2013/0124348 A1 * | 5/2013 | Lal | G06Q 20/202 705/17 |
| 2014/0147122 A1 * | 5/2014 | Ahmed | G08C 23/04 398/106 |
| 2014/0229236 A1 * | 8/2014 | Aggarwal | H04L 43/06 705/7.32 |

(Continued)

*Primary Examiner* — Dhairya A Patel
(74) *Attorney, Agent, or Firm* — Sterne, Kessler, Goldstein & Fox P.L.L.C.

(57) ABSTRACT

Disclosed herein are system, method, and device embodiments for zero touch deployment and dynamic configuration. A management server receives a dynamic configuration value for a configuration setting via a configuration service, and generates configuration information including a mapping of a configuration setting to the dynamic configuration value. Further, the management server receives a configuration information request including an identifier associated with a remote client device, and sends the configuration information to the remote client device.

20 Claims, 8 Drawing Sheets

(56) References Cited

U.S. PATENT DOCUMENTS

| | | | | |
|---|---|---|---|---|
| 2015/0033216 A1* | 1/2015 | Appad | ................ | G06F 8/656 |
| | | | | 717/169 |
| 2015/0074765 A1* | 3/2015 | Haight | ................ | H04L 63/083 |
| | | | | 726/4 |
| 2015/0199667 A1* | 7/2015 | Fernando | ............ | G06Q 20/202 |
| | | | | 705/21 |
| 2016/0080888 A1* | 3/2016 | Kreitzer | ................ | H04B 7/26 |
| | | | | 455/39 |
| 2016/0180311 A1* | 6/2016 | Tung | .................... | G06Q 50/12 |
| | | | | 705/15 |
| 2017/0075840 A1* | 3/2017 | Matsuno | ............... | G06F 13/102 |
| 2017/0091850 A1* | 3/2017 | Alvarez | ................ | H04W 4/30 |
| 2017/0178099 A1* | 6/2017 | Truong | ............... | G06Q 20/322 |
| 2020/0334649 A1* | 10/2020 | Veznedaroglu | .... | G06K 7/10722 |
| 2021/0390816 A1* | 12/2021 | Vera | .................. | G06Q 20/3278 |

* cited by examiner

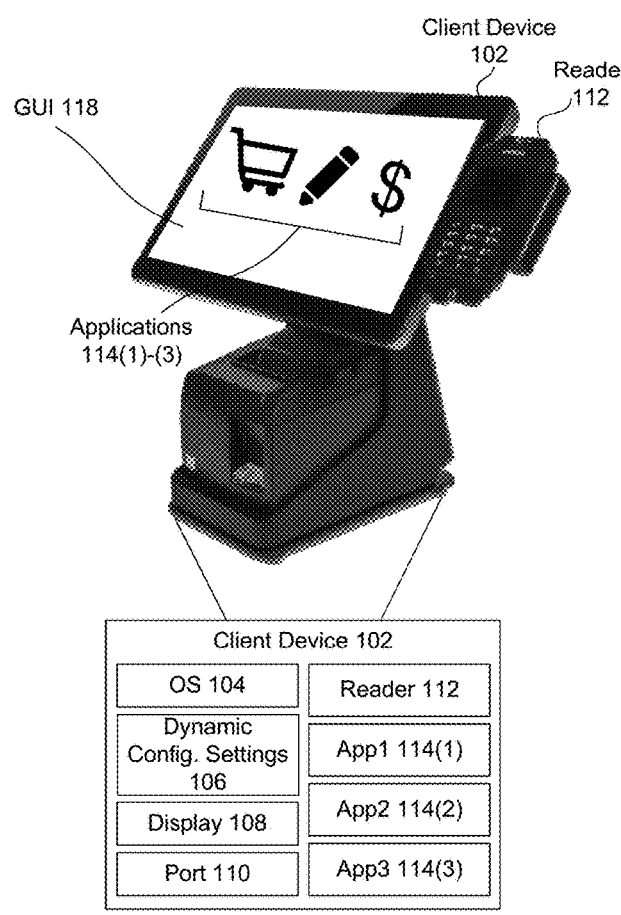
FIG. 1A
FIG. 1B

400

Addition
Control
408

Add Custom Value(s)  [+]

| Custom Name | Custom Value | Action |
|---|---|---|
| menu URL | https:/\{SUB_ENV:+\{lowercase:\{E... | 🗑 |
| ENV | PROD | 🗑 |
| SUB_ENV |  | 🗑 |

Enter Control 410

Deletion
Control
406(1)-(3)

Identifier Field
402(1)-(3)

Value Field
404(1)-(3)

FIG. 4

ZERO TOUCH DEPLOYMENT AND DYNAMIC CONFIGURATION

BACKGROUND

Technical Field

The subject matter disclosed herein relates generally to distributing content, and more particularly to dynamic configuration of client devices with limited or without physical interaction with the individual client devices.

Background

Existing approaches for remotely distributing and installing content or settings on client devices typically require an administrator to individually account for different components and/or attributes across the client devices. As such, administrators have been discouraged or even prevented from efficiently deploying content or settings to client devices. This inefficiency is exacerbated when administrators must address modifications that arise once the client devices are in use.

SUMMARY

Provided herein are system, apparatus, device, method and/or computer program product embodiments, and/or combinations and sub-combinations thereof, for distributing, installing, and/or executing content and dynamic configuration settings on client devices with limited or without physical interaction with the individual client devices.

An example method embodiment may include steps for implementing zero touch deployment and dynamic configuration in a managed device system. Steps of the method may include determining a configuration setting corresponding to a device component information request including an identifier associated with the remote client device and sending the configuration information to a configuration device.

An example apparatus embodiment may include a touch-sensitive display, a memory including a client device identifier identifying the client device, and a processor communicatively coupled to the touch-sensitive display and the memory. The processor may be configured to send, to a remote configuration service, a configuration information request including the client device identifier, and receive, from the remote configuration service, configuration information including mapping of a configuration setting to a dynamic configuration value, wherein the configuration setting corresponding to a device component of the client device. The processor may be further configured to determine a configuration value for the configuration setting based upon the dynamic configuration value, and set a local instance of the configuration setting to the configuration value.

Another example method embodiment may include steps for implementing zero touch deployment and dynamic configuration in a managed device system. Steps of the method may include receiving configuration information including mapping of a configuration setting to a dynamic configuration value, the configuration setting corresponding to a device component of a client device, determining a first configuration value for the configuration setting based upon the dynamic configuration value, and setting a local instance of the configuration setting to the first configuration value. Additionally, the method may include monitoring the device component via a management application of the client device, determining, by the management application, a change to a status of the device component of the client device, determining a second configuration value for the configuration setting based upon the change to the status of the device component, and updating the local instance of the configuration setting to the second configuration value.

BRIEF DESCRIPTION OF THE DRAWINGS

The accompanying drawings are incorporated herein and form a part of the specification.

FIGS. 1A and 1B are block diagrams of an example client device for implementing zero touch deployment and dynamic configuration in a managed device system, according to some embodiments.

FIG. 4 is a block diagram of an example graphical user interface for implementing zero touch deployment and dynamic configuration in a managed device system, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 2:
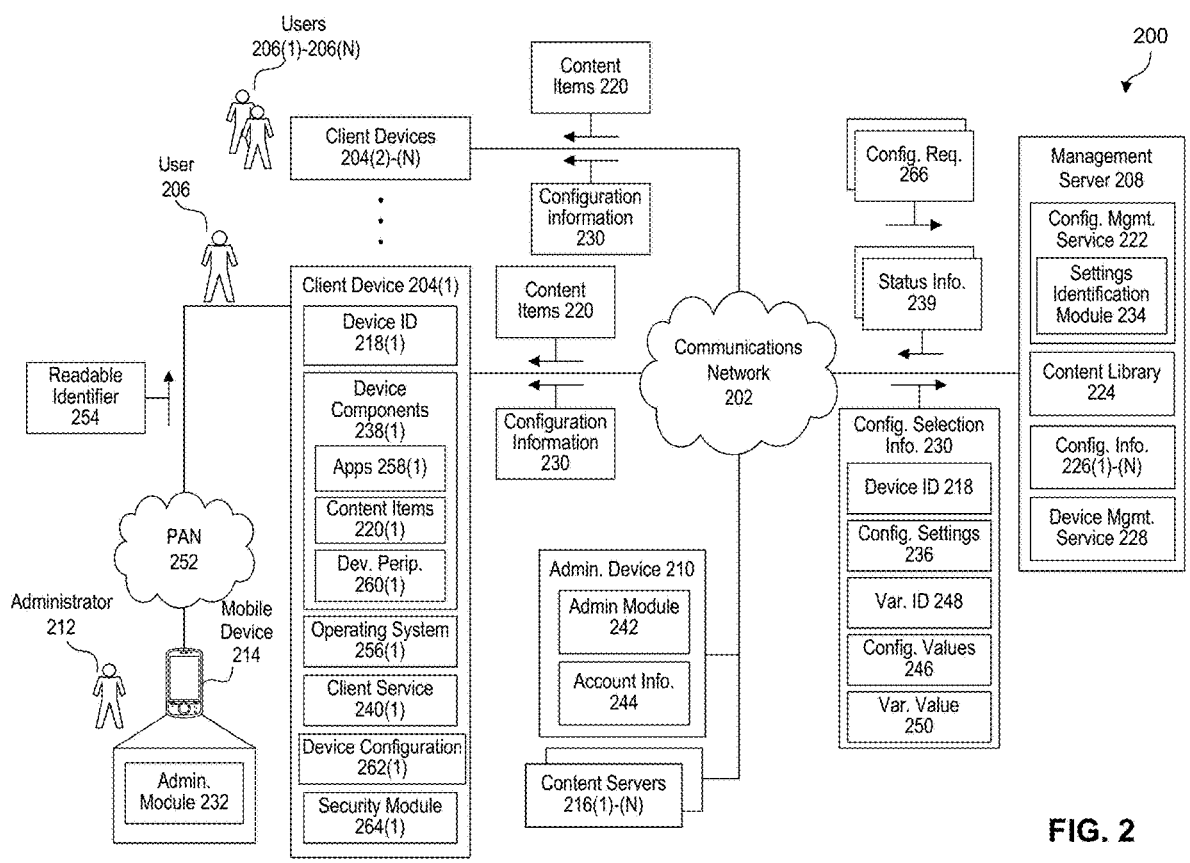
FIG. 2 is a block diagram of an example framework for implementing zero touch deployment and dynamic configuration in a managed device system, according to some embodiments.

Provided herein are system, apparatus, device, method and/or computer program product embodiments, and/or combinations and sub-combinations thereof, for implementing zero touch deployment and dynamic configuration in a managed device system.

FIGS. 1A-1B are block diagrams 100 of a client device for implementing zero touch deployment and dynamic configuration in a managed device system. As used herein, and in some embodiments, "zero touch deployment" may refer to the ability to configure a device without the need for an administrator to manually configure the device and without any initial configuration at the device.

FIG. 1A illustrates a client device 102 including an operating system 104, dynamic configuration settings 106, a display device 108, a peripheral port 110, a card reader device 112 connected to the client device 102 via the peripheral port, a first device application 114(1), a second device application 114(2), and a third device application 114(3).

In some embodiments, the client device 102 may be a device configured to present audio information, graphical content, videos, web sites, and media streams. Some examples of the client device 102 include, but are not limited to, personal computers, laptop computers, smartphones, tablets, kiosks, point of sale stations, appliances, internet of things (IoT) devices, wearables, etc. Additionally, the client device 102 may be an electronic device distributed to a customer and installed in a customer owned location (e.g., a retail establishment).

The operating system 104 may be an application program configured to manage the basic functions of the client device 102. For instance, the operating system 104 may be configured to schedule tasks, manage storage of data on the client device 102, provide common services to the device applications 114(1)-(3), and communicate with peripheral devices (e.g., the card reader device 112). Some examples of the operating system 104 may include Google's Android™ operating system, Microsoft's Windows™ operating system, Apple's Mac OS/X or iOS operating systems, some variety of the Linux operating system, or the like.

As used herein, and in some embodiments, a "device application" may refer to any application or software (e.g., client, agent, application, mobile application, web application, hybrid application, computer program, desktop application, script, or module) operable to run on the client device 102. For example, the device application 114(1) may be a shopping application for purchasing items sold at a retail establishment associated with the client device 102, the device application 114(2) may be a wish list application for making a list of items to purchase at the retail establishment associated with the client device 102, and the device application 114(3) may be a payment application for processing payment information of a credit card read by the card reader device 112.

In addition, the operating system 104 may cause the display device 108 to present a plurality of application icons 116(1)-(3) corresponding to the device applications 114(1)-(3) via a graphical user interface (GUI) 118 of the client device 102. For example, the first application icon 116(1) may correspond to the first device application 114(1), the second application icon 116(2) may correspond to the second device application 114(2), and so forth. Further, each application icon 116 may be selectable via the GUI 118 to launch its corresponding device application 114. For example, the third application icon 116(3) may be selectable to launch the device application 114(3).

As described in detail herein, an administrator of the client device 102 may determine the dynamic configuration settings 106, and remotely configure the client device 102 using the dynamic configuration settings 106. In some embodiments, the dynamic configuration settings 106 may be configuration settings associated with at least one of the operating system 104, one or more device ports (i.e., the port 110) of the client device 102, one or more peripheral devices (e.g., the card reader device 112) connected to the client device 102, or the device applications 114(1)-(3) installed on the client device 102.

Further, the dynamic configuration settings 106 may include variables or scripts. As used herein, and in some embodiments, the term "script" may refer to a one or more commands or instructions executed by a computer program or scripting engine. In some examples, a script may be an administrator script provided by an administrator and/or owner of the client device, a script provided by a manufacturer of the client device 102, or a third-party script provided by a service provider. Further, the variable and scripts may be used to generate configuration settings based on attributes of the client device 102, and relationships between components of the client device 102. As a result, the dynamic configuration settings 106 may be dynamically tied to the current state of the elements and processes associated with the client device 102 or another client device associated with the client device 102. In some embodiments, the dynamic configuration settings 106 offer improvements over static configuration settings that need to be finely set for each individual client device and/or constantly updated in response to changes to the state or components of a client device.

Further, in some embodiments, the scripts may be written in a scripting language. Some examples of scripting languages include Bash, Python, Lua, Beanshell, JavaScript, EcmaScript, ES-Script, SES, TinySES, Jessie, Perl, Ruby, and Tcl. Additionally, or alternatively, the script may be written in one or more programming languages. Some examples of programming languages include JavaScript, Hyper Text Markup Language (HTML), HTML5, BASIC, C, Lisp, Lua, Python, Ruby, Java, Groovy, C, C++, C #, Visual Basic, Objective-C, Rust, and Scala. Further, in some embodiments, the script may be written in a domain specific language (DSL) designed for dynamic configuration.

As an example, a first dynamic configuration setting 106 may configure the operating system 104 to disable the peripheral port 110 when the card reader device 112 is detached from the peripheral port 110. Thus, preventing a user from attaching an unauthorized device to the client device 102 via the peripheral port 110. For instance, the first dynamic configuration setting may include a script that determines the connection status of the connection between the card reader device 112 to the client device 102, and enables or disables the peripheral port 110 based upon the connection status. Alternatively, the first dynamic configuration setting 106 may configure the operating system 104 to limit or reduce the functionality of the peripheral port 110 when the card reader device 112 is detached from the peripheral port 110.

As another example, a second dynamic configuration setting may configure the operating system 104 to disable the device application (i.e., the payment application) 114(3) when the card reader device 112 is detached from the peripheral port 110. For instance, the second dynamic configuration setting may include a script that determines the connection status of the card reader device 112 to the client device 102, and enables or disables the device application 114(3) based upon the connection status.

FIG. 1B illustrates a client device 102 after detachment of the card reader device 112. In response to the detachment of the card reader device 112 from the client device 102, the operating system 104 may disable the peripheral port 110 based on the dynamic configuration settings 106. As such, the peripheral port 110 may not be used to connect any other device to the client device 102.

For example, the operating system 104 may monitor the connection between the client device 102 and the card reader device 112 via the peripheral port 110. Further, when the operating system 104 determines that the card reader device 112 has been detached from the client device 102, the operating system 104 may modify a configuration setting of the peripheral port 110 from enabled to disabled or a state of reduced functionality based upon the dynamic configuration settings 106. In some embodiments, the operating system 104 may determine the card reader device 112 has been detached from the client device 102 based on an event log associated with the operating system 104. For example, the operating system may maintain an event log that records changes to the status of the client device 102. Further, the event log may record the connecting and disconnecting of the card reader device 112 to the client device 102.

Furthermore, in response to the detachment of the card reader device 112 from the client device 102, the operating system 104 may disable the device application 114(3). For example, the operating system 104 may remove the icon 116(3) from a graphical user interface of the client device 102. As such, a user of the client device 102 may no longer launch the device application 114(3) associated with the card reader device 112. In some embodiments, the operating system 104 may merely remove the application icon 116(3) from the GUI 118 of the client device 102. In some other embodiments, the operating system 14 may uninstall one or more files associated with the device application 114(3).

FIG. 2 illustrates a block diagram of an example framework for implementing zero touch deployment and dynamic configuration in a managed device system 200, according to some embodiments. As illustrated in FIG. 2, the managed device system 200 includes a communication network 202, client devices 204(1)-(N) associated with a plurality of users 206, a management server 208, an administrator device 210 associated with an administrator 212, a mobile device 214 associated with the administrator 212, and one or more content servers 216(1)-(N).

Further, the client devices 204(1)-(N), the management server 208, the administrator device 210, the mobile device 214, and the content servers 216(1)-(N) may communicate via the communication network 202. The communication network 202 may include any combination of a private network, personal area network (PAN), Local-Area Network (LAN), Wide-Area Network (WAN), or the Internet. Further, the connection between the client devices 204(1)-(N), the management server 208, the administrator device 210, the mobile device 214, the content servers 216(1)-(N), and the communication network(s) 202 may be a wireless connection (e.g., Bluetooth, ZigBee, Thread/OpenThread, or other short range wireless technology, cellular, Wi-Fi connection, etc.), or a wired connection (e.g., Ethernet, Z-Wave, universal serial bus (USB), etc.), or a combination thereof. In some embodiments, the client devices 204(1)-(N), the management server 208, the administrator device 210, the mobile device 214, and/or the content servers 216(1)-(N) may employ one or more communication protocols to send and receive information over the communication network 202. Further, the client devices 204(1)-(N), the management server 208, the administrator device 210, the mobile device 214, and/or the content servers 216(1)-(N) may employ a publish-subscribe messaging model or a distributed eventual consistency model for communication over the communication network 202.

The client devices 204(1)-(N) are electronic devices controlled and/or manipulated by the users 206(1)-(N). The client devices 204(1)-(N) may include, but are not limited to, personal computers, laptop computers, smartphones, tablets, headless devices, sensors, kiosks, point of sale stations, etc. Further, each client device 204 may be associated with a device identifier 218. In some embodiments, each device identifier 218 may be a unique identifier corresponding to a particular client device 204. Additionally, or alternatively, the device identifier 218 may be a group identifier corresponding to a plurality of client devices 204.

In some instances, the device identifier 218 may be assigned to the client device 204 at the time the client device 204 is manufactured in a manufacturing facility. In some other instances, the device identifier 218 is assigned to hardware that is installed on the client device 204. For example, the administrator 212 may purchase the hardware and install the hardware on the client device 204. As a result, the identifier of the hardware may become the device identifier 218 of the client device 204.

Additionally, the client devices 204(1)-(N) may be electronic devices that are distributed to customers and installed in customer owned locations, such as retail establishments. Once installed, the client devices 204(1)-(N) may provide access to information associated with products and services provided in the retail establishments. Further, client devices 204(1)-(N) may be used by the users 206(1)-(N) who enter the retail establishments and purchase goods or services from the retail establishments. In an embodiment, a retail establishment may place the client devices 204(1)-(N) at particular locations in the retail establishment, such as, in one or more aisles. In another embodiment, the users 206(1)-(N) may carry the client devices 204(1)-(N) throughout the retail establishment.

In some embodiments, the client devices 204(1)-(N) may request and/or receive content items 220(1)-(N) from the management server 208 and/or the content servers 216(1)-(N) over the communication network 202. For instance, as illustrated in FIG. 2, the content server 216(1) may send the content items 220(1)-(N) to the client devices 204(1)-(N). Some examples of content items 220(1)-(N) may include applications, mobile applications, application data, websites, website links, presentations, documents, ticket information, receipt information, movies, advertisements, media content (e.g., digital video, digital audio, streaming multimedia, etc.). Further, the management server 208 and/or the content servers 216(1)-(N) may provide the content items 220(1)-(N) as programmed, on-demand, or through media streaming.

For example, the client device 204(1) may be a kiosk device located in an airport. Further, the client device 204(1) may provide ticket printing services, identification services, payment services, and/or flight information to the users 206(1)-(N) within the airport. For example, the user 206(1) may request an electronic ticket from the client device 204(1). In response, the client device 204(1) may send a request for the ticket information to the content server 216(1). Further, the content server 216(1) may send the ticket information (e.g., the content items 220(1)) to the client device 204(1). Additionally, the client device 204(1) may print a ticket based on the ticket information for the user 206(1) using a device component 238 of the client device 204(1).

In some embodiments, the management server 208 may be a cloud computing environment that includes multiple server devices that host applications for installation on the client devices 204(1)-(N), and data for performing computing operations on the client devices 204(1)-(N). Further, the management server 208 may execute one or more web applications that provide services to the client devices 204(1)-(N), the administrator device 210, and the mobile device 214. In some embodiments, the management server 208 may be a multi-tenant system that services client devices 204 associated with multiple customers (e.g., the administrator 212). Further, each customer may use the management server 208 to manage their respective client devices 204. As used herein, and in some embodiments, the term "multi-tenant system" refers to those systems in which various elements of hardware and software of the system may be shared by one or more customers of the multi-tenant system operator.

As illustrated in FIG. 2, the management server 208 may include a configuration management service 222, a content library 224 including the content items 220(1)-(N) that may be presented and/or installed on the client devices 204(1)-

(N), configuration information 226(1)-(N) including configuration data for the client devices 204(1)-(N), and a device management service 228. In some embodiments, the first configuration information 226(1) may include configuration data for the first client device 204(1), the Nth configuration information 226(N) may include configuration data for the Nth client device 204(N), and so forth.

As described in detail herein, the configuration management service 222 may be configured to manage the provisioning and configuring of the client devices 204(1)-(N). For example, the configuration management service 222 may receive content items 220(1)-(N) and configuration selection information 230 from the administration device 210. Further, the management server 208 may store the content items 220(1)-(N) and the configuration selection information 230.

For instance, the management server 208 may store the content items 220(1)-(N) in the content library 224, and determine configuration information 226 based on the configuration selection information 230. Further, the configuration management service 222 may distribute the content items 220(1)-(N) and the configuration information 226 to the client devices 204(1)-(N) when the client devices 204(1)-(N) become accessible via the communication network 202. In addition, the configuration management service 222 may distribute additional or updated configuration information 226 to the client devices 204(1)-(N) as the administrator device 210 sends additional configuration selection information 230. In some instances, the configuration management service 222 may distribute additional or updated configuration information 226 to the client devices 204(1)-(N) using a synchronization process (e.g., an eventual consistency process) between the configuration information 226 and the device configuration 262.

In some embodiments, the configuration management service 222 may present a website to the administrator device 210 or the mobile device 214. Further, the website may include a graphical user interface that permits the administrator 212 to provide the configuration selection information 230 to the configuration management service 222. For example, the website may include user input fields that receive the configuration selection information 230(1) from the administrator 212, and send the configuration selection information 230(1) to the management server 208. In some other embodiments, the configuration management service 222 may be an application programming interface that permits the administrative device 210 to configure the client devices 204(1)-(N). For example, the configuration management service 222 may be a RESTful API that communicates with a web-based configuration application (e.g., the administration module 232) of the administration device 210.

As illustrated in FIG. 2, the configuration management service 222 may include a settings identification module 234. In some embodiments, the settings identification module 234 may be configured to determine configuration settings 236(1)-(N) associated with device components 238(1)-(N) of the client devices 204(1)-(N). Additionally, the settings identification module 234 may be configured to determine an expected type or format of a value of a configuration setting 236.

Some examples of a device component 238 include an operating system or application installed or to be installed on a client device 204, content presented or to be presented on a client device 204, and/or a device peripheral connected or to be connected to a client device 204. Further, some examples of an expected type or format of a value of a configuration setting include a string literal, a numerical value, a Boolean value, a percentage, a whitelist of permitted functionalities or features, a blacklist of unpermitted functionalities or features, an enable/disable indicator, on/off indicator, a volume level, a screen resolution, an intensity value, a brightness level, a color, a gradient, a uniform resource locator (URL), a port, an account identifier, an authentication credential, a digital certificate, a permission, a role, etc.

In some embodiments, the settings identification module 234 may determine configuration settings 236 associated with a device application (e.g., firmware, operating system, application, etc.) based on inspecting source code associated with the device application. For example, the settings identification module 234 may perform semantic analysis of the source code. In some embodiments, the settings identification module 234 may determine configuration settings 236 associated with a device application based on metadata associated with an installation package (e.g., an Android PacKage (APK)) of the device application. For instance, when the installation package for a device application is added to the content library 224, the settings identification module 234 may determine the configuration settings 236 that the administrator 212 may set with respect to the device application. In yet still another embodiment, the settings identification module 234 may determine configuration settings 236 associated with a device application based on querying a data store or information service listing the configuration settings of the device application.

In some other embodiments, the settings identification module 234 may determine configuration settings 236 associated with a device component 238 based on historic configuration selection information 230 or historic configuration information 226. For instance, the settings identification module 234 may determine a configuration setting 236 for the device components 238(1) of the client device 204(1) based upon inspecting the configuration information 226(2)-(10) of other client devices 204(2)-(10) associated with the device component 238(1).

In some other embodiments, the settings identification module 234 may determine configuration settings 236 associated with a device component 238 based upon a type of the device component 238. For example, the settings identification module 234 may determine that a content item 220(1) added to the content library is an audio-visual file (e.g., a .WEBM file, a .MP4 file, a .OGG file, a MPG file, .MPV file, .MPEG file, .M4V file, etc.). Further, the settings identification module 234 may determine that audio-visual files often are associated with configuration settings 236 that control playback of the audio-visual file. As such, the settings identification module 234 may determine that playback resolution, playback speed, playback volume, and/or closed captioning may be configuration settings 236 associated with the content item 220(1). Further, in some embodiments, the settings identification module 234 may determine configuration settings 236 based on a device driver associated with the device component 238.

In some embodiments, the device management service 228 may be configured to permit the administrator 212 to remotely monitor the client device 204(1)-(N). For example, the device management service 228 may monitor the status of the kiosk device 204(1) within the airport, and present status information 239 to the administrator device 210. As another example, the device management service 228 may be used to control the operation of the client device 204(1). For instance, the device management service 228 may be used to set a playlist of content items 220(1)-(N) to present on the kiosk device 204(1), view the peripheral devices connected kiosk device 204(1), adjust the volume on the kiosk device 204(1), install or remove a device application on the kiosk device 204(1), reboot or shutdown the kiosk device 204(1), set a screensaver for client device 204(1), select a configuration version for the client device 204(1), etc.

The administrator device 210 may be configured to remotely configure and manage the client devices 204(1)-(N) via the management server 208. In some embodiments, the administrator 212 may be a customer that purchases, rents, or owns the client devices 204(1)-(N). Further, the administration device 210 may include, but is not limited to, a laptop, a desktop, a tablet, a smartphone, or any other electronic device capable of communicating with the management server 208. In some embodiments, the mobile device 214 may also be an administrator device.

As illustrated in FIG. 2, the administration device 210 may include an administration module 232 for provisioning and/or configuring the client devices 204(1)-(N). Further, the administration module 232 may be configured to communicate with the configuration management service 222 and the device management service 228. In some embodiments, the administration module 232 may be a web browser configured to communicate with the configuration management service 222 and the device management service 228. In some embodiments, the administration module 232 may be a client application configured to communicate with the configuration management service 222 and the device management service 228. Further, the mobile device 214 may also include an administration module 242 with similar functionality to the administration module 232 for provisioning and/or configuring the client devices 204(1)-(N).

Further, the administration device 210 may include account information 244 associated with the administrator 212. In some embodiments, the administrator 212 creates the account information 244 using the administration module 232. For example, the administrator 212 may use the administrator module 232 to create account information 244 including an account identifier (e.g., user name, email address, etc.) and an authentication credential (e.g., password). In some embodiments, the management server 208 may require that the administrator 212 login using the account information 244 before communicating with the configuration management service 222 and/or the device management service 228 via the administrator module 232.

As described in detail herein, the administration module 232 may reduce direct administrator 212 interaction with the client devices 204(1)-(N) during set-up, application installation, or content downloads. Additionally, the administrator module 232 permits the administrator 212 to perform remote batch configuration of the client devices 204(1)-(N). In some embodiments, the client devices 204(1)-(N) may be heterogeneous devices. For example, the client devices 204(1)-(N) may have different device components (e.g., hardware, firmware, operating systems, computer programs, functions, etc.). However, the administrator module 232 may permit the administrator 212 to perform batch configuration of a plurality of heterogeneous client devices 204 using the same configuration selection information 230.

For example, the administrator 212 may use the administration module 232 to send the configuration selection information 230 to the configuration management service 222 of the management server 208. In some embodiments, the configuration selection information 230 may include one or more device identifiers 218 identifying one or more client devices 204 associated with the configuration selection information 230. For instance, the configuration selection information 230 may include the device identifier 218(1) of the client device 204(1) thereby indicating that the configuration management service 222 may use the configuration selection information 230 to configure the client device 204(1). As another example, the configuration selection information 230 may include the device identifiers 218(1)-(6) of the client devices 204(1)-(6) thereby indicating that the configuration management service 222 may use the configuration selection information 230 to configure the client devices 204(1)-(6).

As described in detail herein, the configuration management service 222 may configure the client devices 204 associated with the device identifiers 218 based on the configuration selection information 230. For example, the configuration management service 222 may receive configuration selection information 230 including the device identifiers 218 for the associated client devices 204, one or more configuration settings 236(1)-(N), one or more configuration values 246(1)-(N), one or more variable identifiers 248(1)-(N), and one or more variable values 250(1)-(N).

In some embodiments, a first configuration value 246(1) may correspond to a first configuration setting 236(1), an Nth configuration value may correspond to an Nth configuration value 246(1), and so forth. Further, a configuration value 246 may include an expression, or a script including one or more expressions. As referred to herein, and in some embodiments, an "expression" may include a combination of constants, variables (e.g., a variable value 250), other configuration values, operators, and functions that may be interpreted by a programming language to return a value. In some instances, the variables may be of a primitive type or complex data type.

Additionally, in some embodiments, a first variable value 250(1) may be assigned to a first variable identifier 248(1), an Nth variable value 250(N) may be assigned to an Nth variable identifier 248(N), and so forth. Further, a variable identifier 248 may be nested within a configuration value 246, thereby injecting the variable value 250 into the evaluation of the configuration value 246. As referred to herein, and in some embodiments, a "variable identifier" may be a lexical token that identifies an entity that may be referred to within a configuration value. In some embodiments, a variable identifier 248 may include an alphanumeric sequence. Further, in some embodiments, a variable value may include a constant value, an expression, a variable identifier, or a script. In some instances, the variable value may be of a primitive type or complex data type. In some other instances, the variable value may represent the state of a device component 238.

In some embodiments, the configuration setting 236 and the configuration value 246 may be used to configure at least one of the client devices 204. Some aspects of a client device 204 that may be configured using a configuration setting 236 and a configuration value 246 include content accessible to the client devices 204(1)-(N), downloadable content, installed applications, application settings, an application whitelist, an application blacklist, accessible websites, restricted content, permitted device operations, usage restrictions, device settings (e.g., brightness/contrast settings, screen resolution, speaker activation, volume control, language preferences, keyboard preferences, accessibility options, application activation, operating system settings, screen saver settings, etc.), user-defined settings, reboot information, shutdown information, peripheral whitelists, peripheral blacklists, authentication information, authorization information, network configuration, network security information, firewall information, connectivity settings, etc.

In some embodiments, the configuration management service 222 may send the configuration settings identified by the settings identification module 234 to the administrator device 210. For example, the configuration management service 222 may present the identified configuration settings to the administrator 212 within a website. Further, the administrator 212 may select the configuration settings 236 from the identified configuration settings, and provide the configuration values 246 for the configuration setting 236(1). Additionally, or alternatively, in some embodiments, the administrator 212 may provide the configuration settings 236 within the configuration selection information 230.

Upon receipt of the configuration selection information 230, the configuration management service 222 may generate the configuration information 226. For example, the configuration management service 222 may generate the first configuration information 226(1) based upon the first configuration selection information 230(1). Further, the configuration management service 222 may send the configuration information 226 to one or more client devices 204 based upon the device identifiers 218 included in the configuration selection information 230(1)-(N). For example, the configuration management service 222 may send the configuration information 226(1) to the client device 204(1) based on the configuration selection information 230(1) including the device identifier 218(1) of the client device 204(1). Alternatively, in some embodiments, the administration module 232 may generate the configuration information 226, and send the configuration information 226 directly to the client device 204(1).

As another example, the configuration management service 222 may send the configuration information 226(1) to the client devices 204(1)-(6) based on the configuration selection information 230(1) including the device identifiers 218(1)-(6) of the client devices 204(1)-(6). Alternatively, in some embodiments, the administration module 232 may generate the configuration information 226, and send the configuration information 226 directly to the client devices 204(1)-(6).

In some embodiments, the configuration information 226 may include instructions that cause a client device 204 to set a configuration setting 236 to a configuration value 246. Further, the configuration information 226 may include instructions that cause a client device 204 to store a variable identified by the variable identifier 248, and set the value of the stored variable to the variable value 250.

In some embodiments, the configuration management service 222 may validate the variable identifiers 248, variable values 250, configuration settings 236, or configuration values 246 when generating the configuration information 226(1)-(N). For example, the configuration management service 222 may verify that the configuration selection information 230 does not include multiple configuration values 246 assigned to the same configuration setting 236. As another example, the configuration management service 222 may verify that the configuration selection information 230 does not include multiple variable values 250 assigned to the same variable identifier 248.

As yet another example, the configuration management service 222 may verify that a configuration value 246 matches the expected type of its corresponding configuration setting 236. In some embodiments, the settings identification module 234 may determine the expected type of the configuration setting 236. For instance, the expected type of the configuration setting 236(1) for a brightness of the screen display of the client device 204(1) may be a percentage. As such, the configuration management service 222 may verify that the configuration value 246(1) corresponding to the configuration setting 236(1) evaluates to a percentage or a value that may be converted to a percentage.

In some embodiments, when the configuration management service 222 determines that a variable identifier 248, variable value 250, configuration setting 236, or configuration value 246 is invalid, the configuration management service 222 may request the administrator 212 send updated configuration selection information 230 including a valid value for the variable identifier 248, variable value 250, configuration setting 236, or configuration value 246 that has been identified as invalid. Once the administrator 212 has provided valid configuration selection information 230, the configuration management service 222 may generate the configuration information 226 based on the valid configuration selection information 230. Alternatively, the configuration management service 222 may generate the configuration information 226 based on removing the invalid data from the configuration selection information 230.

As described in detail above, the configuration management service 222 may generate the configuration information 226(1) based on the configuration selection information 230(1), and send the configuration information 226(1) to the client device 204(1) via the communication network 202. Additionally, or alternatively, the configuration management service 222 may send the configuration information 226(1) to the mobile device 214 or the administrator device 210 via the communication network 202. For example, in some embodiments, the client device 204(1) may have limited network connectivity to the management server 208 due to security concerns and/or network availability issues. As such, the configuration management service 222 may send the configuration information 226(1) to the mobile device 214, and the administrator 212 may use the mobile device 214 to transfer the configuration information 226(1) to the client device 204(1).

Further, the mobile device 214 and the client device 204(1) may form a PAN 252, and the mobile device 214 may send the configuration information 226(1) to the client device 204(1) via the PAN 252. Additionally, or alternatively, the client devices 204(1) and 204(2) may form a PAN 252, and the client device 204(1) may send the configuration information 226(1) or updates to the configuration information 226(1) to the client device 204(2) via the PAN 252. Some examples of PAN communications include Bluetooth, near field communications (NFC), Z-Wave, ZigBee, Thread, OpenThread, or any other short range wireless technology. In yet still some other embodiments, the client device 204(1) may employ another device (e.g., one of the client devices 204(2)-(N)) as an intermediary device (e.g., a proxy device) to connect to the management device 208, and receive the configuration information 226(1) via the proxy connection. In some instances, the intermediary device may be another device managed by the configuration management service 222 or a device that is not managed by the configured management service 222.

In some other embodiments, the configuration management service 222 may generate a readable identifier 254 (e.g., 1D barcode, 2D barcode, a quick response (QR) code, matrix barcode, etc.) that encodes the configuration information 226, and send the readable identifier 254 to the mobile device 214. Further, the administrator 212 may present the readable identifier 254 to a device component 238(1) (e.g., a camera) capable of detecting the readable identifier 254. Additionally, or alternatively, the administration module 242 of the mobile device 214 may generate the readable identifier 254 based on the configuration information 226(1). In yet still some other embodiments, a wired connection (e.g., USB, serial communication interface, etc.) may be formed between the mobile device 214 or the administrator device 210 and the client device 204(1) for transfer of the configuration information 226(1).

As illustrated in FIG. 2, each client device 204 may include an operating system 256, a client service 240, a device identifier 218, device components 238 (e.g., one or more applications 258, content items 220, and/or one or more device peripherals 260), device configuration 262, and a security module 264. The operating system 256 or the client service 240 may be configured to receive the configuration information 226 from the management server 208, and configure the client device 204 in accordance with the configuration information 226. Further, in some embodiments, the client service 240 may be an aspect of the operating system 256.

For example, the client service 240(1) may determine that the client device 204(1) has network connectivity with the management server 208, and send a configuration request 266(1) to the management server 208 notifying the management server 208 that the client device 204(1) is online. As a result, the management server 208 may identify the configuration information 226(1) associated with client device 204(1), and send the configuration information 226(1) to the client device 204(1). Further, the operating system 256(1) and/or the client service 240 may configure the client device 204(1) in accordance with configuration information 226(1).

For example, the operating system 256(1) and/or client service 240(1) may install the applications 258 on the client device 204(1) without invoking system calls or generating pop-ups that require human input. In this way, the operating system 256(1) and/or client service 240(1) seamlessly installs the applications 258 on client device 204(1) without input or permission from persons interacting with client devices 204(1). In some embodiments, the applications 258 may be identified in the configuration information 226(1).

Further, the operating system 256(1) and/or client service 240(1) may download and present the content items 220 on the client device 204(1) without invoking system calls or generating pop-ups that require human input. In this way, the operating system 256(1) and/or client service 240(1) may seamlessly present the content items 220 on client device 204(1) without input or permission from persons interacting with client devices 204(1). In some embodiments, the content items 220 may be identified in the configuration information 226(1).

In addition, the operating system 256(1) and/or client service 240(1) may update the device configuration 262 of the client device 204(1) based on the configuration information 226(1) without invoking system calls or generating pop-ups that require human input. In this way, the operating system 256(1) and/or client service 240(1) may seamlessly configure the client device 204(1) without input or permission from persons interacting with client devices 204(1). For example, the configuration information 226(1) may include a mapping of a configuration setting 236(1) to a configuration value 246(1). As a result, the client service 240(1) may update set a local instance of the configuration setting 236(1) within the device configuration 262(1) to the configuration value 246(1). As used herein, and in some embodiments, a "mapping" may refer to a paired association between an identifier of a configuration setting and a configuration value to be used by a device with respect to the configuration setting.

As described in detail herein, in some embodiments, the configuration value 246(1) may be a constant value, a variable valuable, an expression, or a script. For instance, the configuration information 226(1) may include a mapping of a variable identifier 248(1) to a variable value 250(1). Further, the configuration value 246(1) may include the variable value 250(1). As such, the client service 240(1) may store the mapping within the device configuration 262 and evaluate the value of the variable value 250(1) when determining the value of configuration value 246(1) including the variable value 250(1). Usage of an expression or a script for a configuration value 246 or variable value 250 improves the ability of the administration module 242 to configure multiple client devices 204 using the same configuration information 226, as the configuration value 246 or variable value 250 may include logic that dynamically modifies the device configuration 262 of a client device 204(1) based upon local attributes of the client device 204(1) or remote attributes of another client device 204(2)-(N) associated with the client device 204(1). Further, it improves upon static configuration approaches by permitting the administrator 212 to generate device configuration 262 that dynamically updates based on events associated with the individual client devices 204.

As an example, the client devices 204(1) and 204(2) may receive the same configuration information 230 from the management server 208. In particular, the configuration information 230 may include a script that configures the client device 204(1) to disable a device component 238(1) when a device peripheral 260(1) is disconnected from the client device 204(1), and configures the client device 204(2) to disable a device component 238(2) when a device peripheral 260(2) is disconnected from the client device 204(2). Further, upon disconnection of the device peripheral 260(1) from the client device 204(1), the administrator 212 would not be required to update the device configuration 262(1) of the client device 204(1) to disable the device component 238(1). Similarly, upon disconnection of the device peripheral 260(2) from the client device 204(2), the administrator 212 would not be required to update the device configuration 262(2) of the client device 204(2) to disable the device component 238(2).

As another example, the client devices 204(1) and 204(2) may receive the same configuration information 230 from the management server 208. In particular, the configuration information 230 may include a script that configures the client device 204(1) to enable an application 258(1) when a device peripheral 260(1) is connected to the client device 204(1), and configures the client device 204(2) to enable an application 258(2) when a device peripheral 260(2) is connected to the client device 204(2). Further, upon connection of the device peripheral 260(1) to the client device 204(1), the application 258(1) may be enabled on the client device 204(1) without further input of the administrator 212. Similarly, upon connection of the device peripheral 260(2) to the client device 204(2), the application 258(1) may be enabled on the client device 204(2) without further input of the administrator 212.

As yet another example, the client devices 204(1) and 204(2) may receive the same configuration information 230 from the management server 208. Further, the configuration information 230 may include a configuration value 246. In particular, the configuration value 246 may be a URL including a variable identifier 248 included in the device configuration 262(1) and device configuration 262(2). In other words, the variable identifier 248 is nested within the configuration value 246. In some embodiments, the variable value 250 corresponding to variable identifier 248 may be locally set based upon one or more attributes of the client devices 204(1) and 204(2), respectively. For example, the variable identifier 248 may evaluate to a first value based on the device components 238(1) of the client device 204(1) and a second value based on the device component 238(2) of the client device 204(2).

Further, the client devices 204(1) and 204(2) may request and receive content items 220 from the URL corresponding to the configuration value 246. As a result, the attributes of the client devices 204(1) and 204(2) may determine the source of the content items 220 sent to the client devices 204(1) and 204(2). Thus, the administrator 212 may send the same configuration information 230 to a group of heterogeneous devices while accounting for the differences amongst the client devices 204 via dynamic configuration.

For instance, the configuration value 246 may evaluate to a URL of a content server 216(1) that streams three dimensional content items 220(1) based on the client device 204(1) including a device component 238(1) with three dimensional display capabilities. Further, the configuration value 246 may evaluate to a URL of a content server 216(2) that streams high definition content items 220(2) based on the client device 204(2) including a device component 238(2) with high definition display capabilities.

As described in detail above, the mobile device 214 or the administrator device 210 may send or present a readable identifier 254 to the claim device 204(1). Upon receipt of the readable identifier 254, the client service 240 may decode the readable identifier 254 to determine the configuration information 226 corresponding to the readable identifier 254. Further, the client service 240(1) may configure the client device 204(1) in accordance with the configuration information 226 determined from the readable identifier 254.

The security module 264 may be configured to perform authentication and authorization services for the client device 204. For example, the security module 264(1) may verify that the configuration information 226(1) was provided by the management server 208 based on verifying an authentication credential included in the configuration information 230. Further, if the security module 264 is unable to authenticate the sender of the configuration information 226(1), the client service 240 may not be authorized to use the configuration information 226(1) to configure the client device 204(1).

In some examples, the authentication credential may include an encrypted hash generated using a private encryption key associated with the management server 208. In some other examples, the security module 264(1) may form a secure communication channel with the management server 208 via a communication protocol in order to securely receive the configuration information 226(1). For instance, the security module 264(1) may establish a Hypertext Transfer Protocol Secure (HTTPS), Web Socket protocol, or JSON Web Token (JWT) communication channel between the management server 208 and the client device 204(1).

As another example, the security module 264 may manage the secure evaluation of a variable value 250 or a configuration value 246. For instance, the security module 264(1) may maintain a secure execution environment for executing a script to determine the value of a configuration value 246. In some embodiments, the secure execution environment may include an execution environment that is isolated from one or more resources of the client device 204(1). In an embodiment, the secure execution environment may include a virtual machine that is isolated from one or more resources of the client device 204(1).

Further, the security module 264 may implement an object capability security model to prevent unauthorized configuration actions with respect to the device components 238. For instance, the security module 264(1) may determine whether an actor (e.g., process) is authorized to perform an operation corresponding to a device component 238(1) based upon possession of a token (e.g., a random number) indicating that the actor has been previously granted the capability to perform the operation with respect to the device component 238(1). In some embodiments, the secure execution environment may be provided via the object capability security model, Secure EcmaScript (SES) environment and/or a safe subset programming language (e.g., Jessie).

Figure 3:
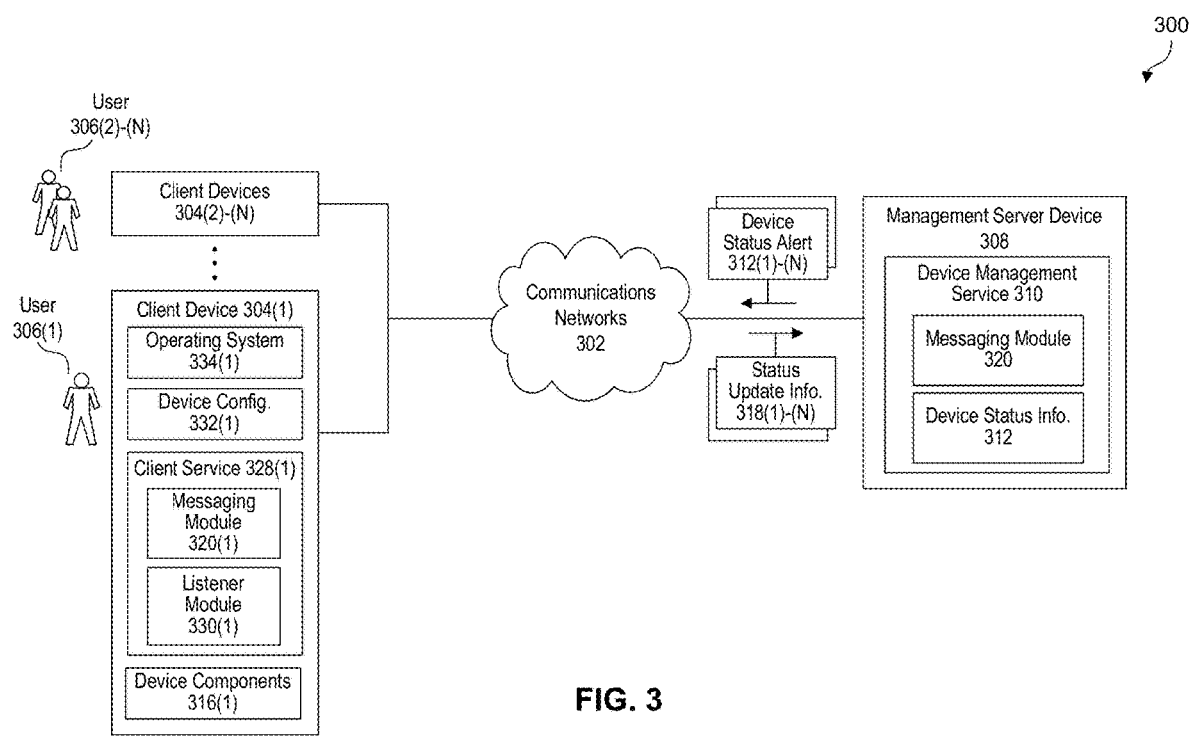
FIG. 3 is a block diagram of an example for implementing zero touch deployment and dynamic configuration in a managed device system, according to some embodiments.

FIG. 3 illustrates a block diagram of an example framework for implementing zero touch deployment and dynamic configuration in a managed device system 300, according to some embodiments. As illustrated in FIG. 3, the managed device system 300 includes a communication network 302 (e.g., the communication network 202), client devices 304 (1)-(N) associated with a plurality of users 306(1)-(N), and a management server 308 (e.g., the management server 208).

The management server 308 may include a device management service 310 that includes device status information 312 and a messaging module 314. The device status information 312 may include status information representing current and historic state information of the device components 316(1)-(N) of the client devices 304(1)-(N). In some embodiments, the device status information 312 may include the device components 316(1)-(N) of the client devices 304(1)-(N), the availability of the device components 316(1)-(N), communication information for establishing communication channels with the device components 316(1)-(N), security information corresponding to the device components 316(1)-(N), capability information describing the capabilities of the device components 316 (1)-(N), etc.

Further, the management server 308 may maintain the device status information 312 based upon the status update information 318(1)-(N) received from the client devices 304(1)-(N). In some embodiments, the messaging modules 320(1)-(N) of the client devices 304 may periodically send the status update information 318(1)-(N) identifying the device components 316(1)-(N) of the client devices 304(1)-(N), the availability of the device components 316(1)-(N), communication information for establishing communication channels with the device components 316(1)-(N), security information corresponding to the device components 316 (1)-(N), capability information describing the capabilities of the device components 316(1)-(N), etc. Additionally, or alternatively, the messaging modules 320(1)-(N) of the client devices 304 may send the status update information 318(1)-(N) in response to local changes to the device components 316(1)-(N) of the client devices 304(1)-(N).

Upon receipt of the status update information 318(1)-(N), the device management service 310 may update the device status information 312, and send device status alerts 322 (1)-(N) to the client devices 304(1)-(N). In some embodiments, the device status alerts 322(1)-(N) include information reflecting changes to the device status information 312. In some instances, the messaging module 314 may periodically send the device status alerts 322(1)-(N). Additionally, or alternatively, the messaging module 314 may send the device status alerts 322(1)-(N) in response to changes to the device status information 312 and/or a request from a client device 304.

In some embodiments, the device configuration 324 of the client devices 304(1)-(N) may be based on the device status alerts 322(1)-(N). For example, the client device 304(1) may include a point of sale device configured by the device configuration 324 to print sales receipts to the closest printer attached to a group of other client devices 304(2)-(N). For instance, the device configuration 324 may include a mapping of the default printer setting to a script that identifies the other client devices 304(2)-(N) directly connected to a printer, and determines which of the identified client devices 304(2)-(N) is closest to the client device 304(1). Initially, a client service 326(1) (e.g., the client service 240) of the client device 304(1) may execute the script and determine that a device component 316(2) (i.e., printer) of the client device 304(2) is the default printer.

Further, the client service 326(1) may include a listener module 328(1) that monitors printer information included in the device status alerts 322(1)-(N). In addition, if the listener module 328(1) determines that there has been a change to the printer information of the group of other client devices 304(2)-(N), the listener module 328(1) may instruct the client service 326(1) to re-execute the script to determine an updated value of the default printer setting. For example, the client service 326(1) may re-execute the script and determine that a device component 316(3) (i.e., printer) of the client device 304(3) is the new default printer in view of the most recently received device status alert 322.

In some embodiments, the client service 326(1) may configure the listener module 328(1) to monitor the device status alerts 322(1) and device components 316(1)-(N) for particular information during the configuration process. For instance, upon receiving configuration information (e.g., the configuration information 226(1)), the client service 326(1) may configure the listener module 328(1) to monitor device status alerts 322(1) and/or the device components 316(1)-(N) for information pertaining to variable values (e.g., variable values 250(1)) of the device configuration 324(1), and information pertaining to configuration variables (e.g., 246(1)) of the device configuration 324(1) that include variable values or a script. Further, in some embodiments, aspects of the listener module 328(1) may be performed by the operating system 330 of the client device 304(1) in addition to the client service 326(1).

In some embodiments, the messaging module 314 and the messaging modules 320(1)-(N) may implement a publish-subscribe pattern. In some other embodiments, the client devices 304(1)-(N) may implement a peer to peer messaging pattern. For example, the client service 326(1) may identify a change to the status of a device component 316(1) of the client device 304(1), and the messaging module 320(1) of the client device 304(1) may send a device status alert 322(1) indicating the status change to the other client devices 304(2)-(N). In yet still some other embodiments, the messaging module 314 and the messaging modules 320(1)-(N) may implement a synchronization process (e.g., an eventual consistency model) between the management server 308 and the client devices 302(1)-(N).

FIG. 4 illustrates an example graphical user interface for implementing zero touch deployment and dynamic configuration in a managed device system, according to embodiments of the present disclosure. FIG. 4 displays a GUI 400 for providing configuration selection information (e.g., configuration selection information 230) to a configuration management service (e.g., configuration management service 222). As illustrated in FIG. 4, the GUI 400 may include identifier fields 402(1)-(3) with corresponding value fields 404(1)-(3).

In some embodiments, the identifier fields 402 may receive variable identifiers (e.g., variable identifier 248) or configuration settings (e.g. configuration setting 236). For example, the identifier field 402(1) includes the configuration setting "menu URL" that indicates a web address for retrieving a menu to display on a client device (e.g., the client device 304(1)). As another example, the identifier field 402(2) includes an administrator created variable identifier "ENV". Further, in some embodiments, an administration module (e.g., the administration module 232) may prepopulate or auto suggest configuration settings within the identifier fields 402.

In addition, the value fields 404(1)-(3) may receive variable values (e.g., variable value 250) or configuration values (e.g. configuration value 246). For example, the variable field 404(1) may receive a dynamic configuration value that includes the nested variable identifier of 402(2). As another example, the value field 404(2) includes the string literal "PROD", which is used when evaluating the value of the variable field 404(1).

Further, as illustrated in FIG. 4, the GUI may include the deletion control 406(1)-(3) corresponding to the identifier fields 402(1)-(3) and the value fields 404(1)-(3). For example, an administrator may select the deletion control 406(1) to remove the identifier field 402(1) and the value field 404(1) from the GUI 400. Additionally, the GUI 400 may include an addition control that may be selectable by the administrator to an additional identifier field and variable field to the GUI 400. In addition, the GUI 400 may include an enter control 410. When the enter control 410 is selected by the administrator, the administration module may send the identifier fields 402 and value fields 404 as configuration selection information to a configuration management service.

Figure 5:
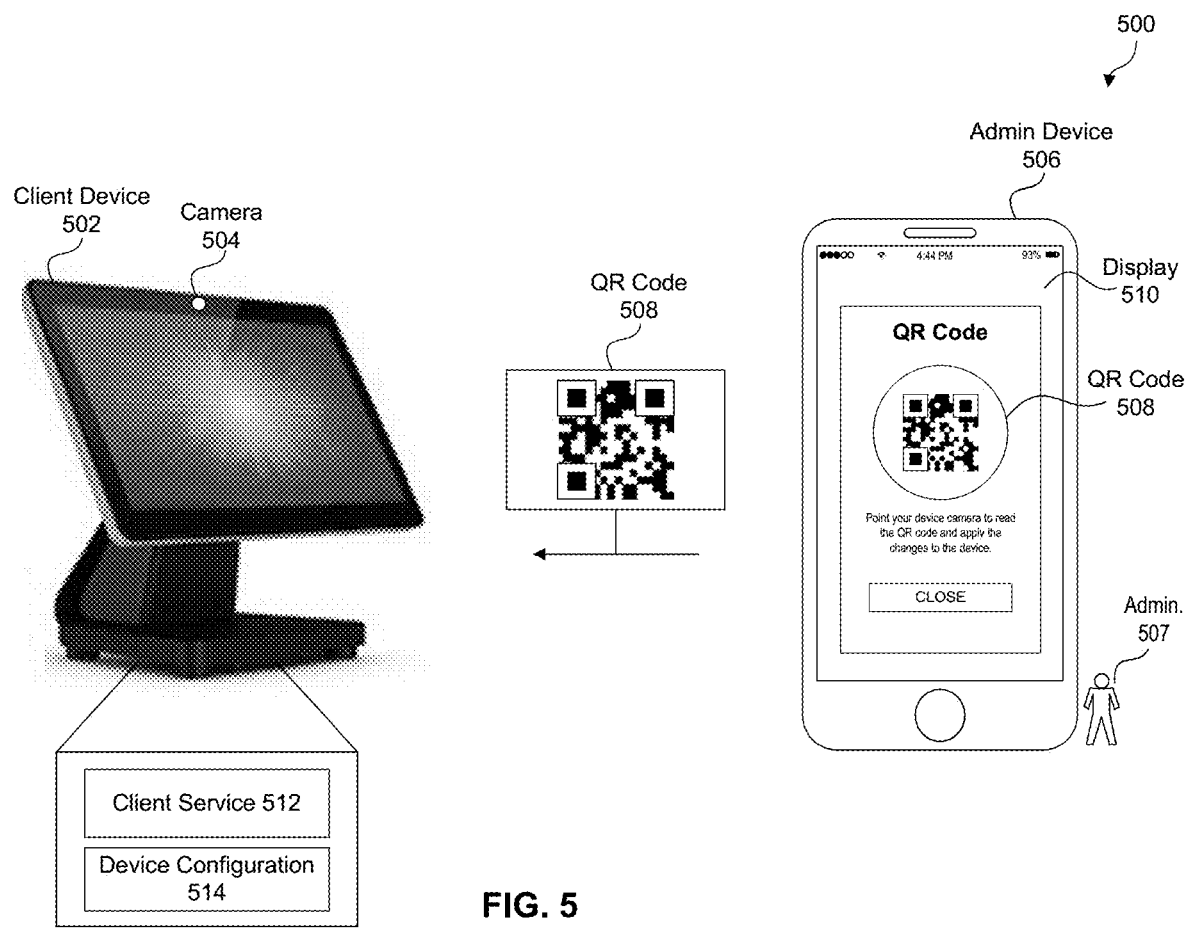
FIG. 5 is a block diagram of an example for distributing dynamic configuration settings in a managed device system, according to some embodiments.

FIG. 5 illustrates a block diagram of an example for distributing dynamic configuration settings in a managed device system 500, according to some embodiments. As illustrated in FIG. 5, the managed device system 500 includes a client device 502 including a camera 504, and an administrator device 506 (e.g., the mobile device 214 or the administrator device 210) associated with an administrator 507.

As described in detail above, the administrator device 506 may receive a QR code 508 (e.g., the readable identifier 254) from a configuration management service (e.g., the configuration management service 222). Alternatively, the administrator device 506 may receive configuration information (e.g., the configuration information 226) from a management server (e.g., the management server 208), and generate the QR code 508 based on the configuration information. Further, the administrator 507 may cause the QR code 508 to be displayed on a display 510 of the administrator device 506. Additionally, the administrator 507 may position the administrator device 506 with respect to the client device 502 so that the camera 504 may read the QR code 508 presented on the display 510. In response, a client service 512 of the client device 502 may determine device configuration 514 for the client device 502 based upon decoding the QR code 508, as described in detail herein. In some other embodiments, the administrator device may employ one or more other types of readable identifiers (e.g., 1D barcode, 2D barcode, matrix barcode, etc.) to provide configuration information to the client device 502.

Figure 6:
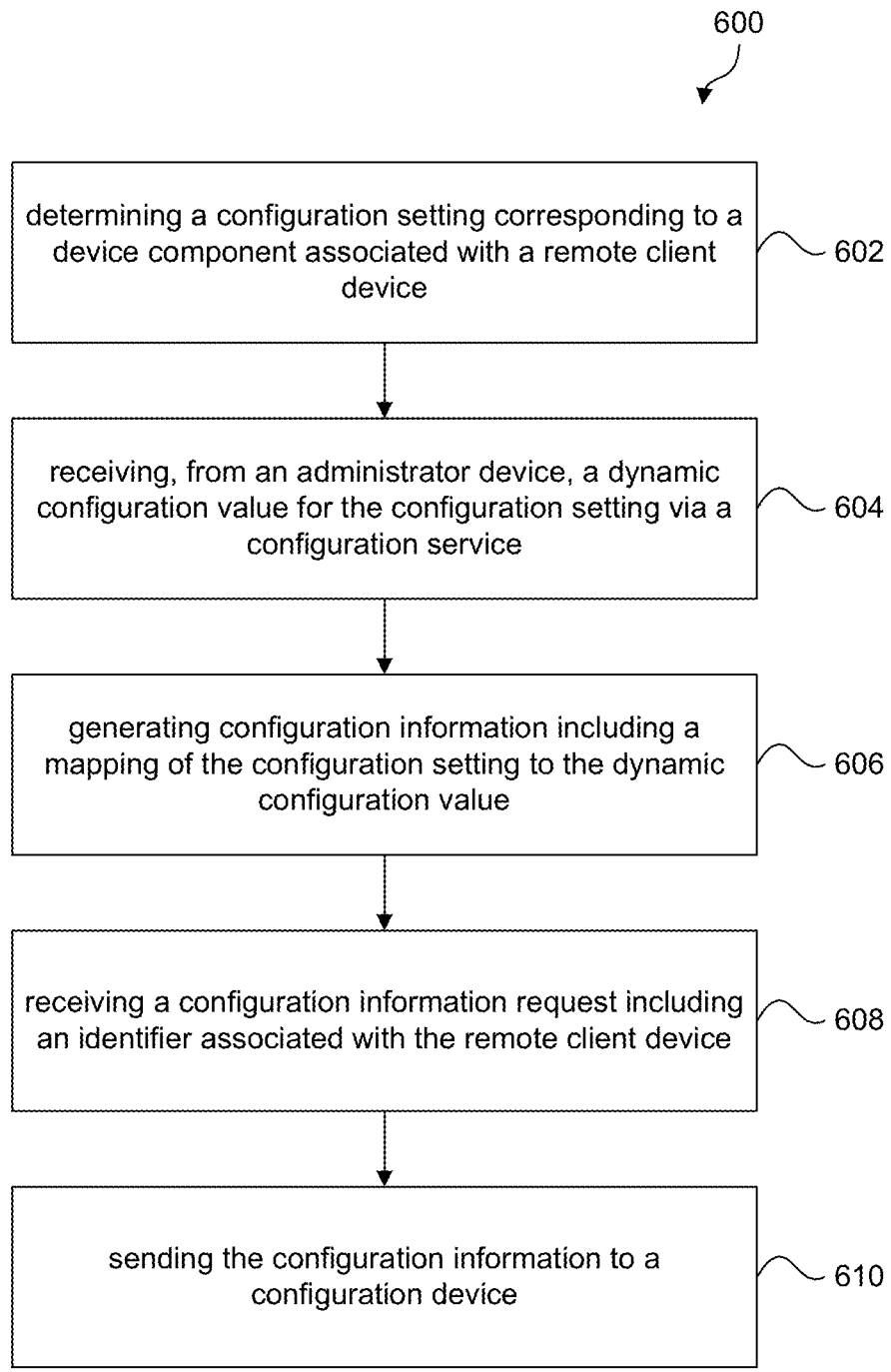
FIG. 6 is a flowchart illustrating a process for implementing zero touch deployment and dynamic configuration in a managed device system, according to some embodiments.

FIG. 6 is a flowchart for a method 600 for a process for implementing zero touch deployment and dynamic configuration in a managed device system, according to an embodiment. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6 as will be understood by a person of ordinary skill in the art.

Method 600 shall be described with reference to FIGS. 2 and 4. However, method 600 is not limited to that example embodiment.

In 602, the management server may determine a configuration setting corresponding to a device component associated with a remote client device. For instance, the settings identification module 234 may determine configuration settings 236 corresponding to the device components 238(1) of the client device 204(1).

As an example, the settings identification module 234 may determine that the client device 204(1) is a kiosk device including a ticket printing functionality. Further, the settings identification module 234 may determine that a configuration setting 236 associated with airline ticket printing functionality is a configuration setting 236 that identifies a target printing device. Further, the management server 208 may send the configuration setting 236 to the administrator device 210 for presentation within the GUI 400.

In 604, the management server may receive, from an administrator device, a dynamic configuration value for the configuration setting via a configuration service. For instance, the administrator 212 may enter a configuration value 246 corresponding to a configuration setting 236 within the GUI 400. Further, the administrator module 242 may determine configuration selection information 230 including the configuration setting 236 and the configuration value 246, and send the configuration selection information 230 to the management server 208.

As an example, the administrator 212 may submit a script as the configuration value 246 within the GUI 400. Further, the script may determine the toner level of a local printer attached to the client device 204(1) and determine if there is enough toner to print a predetermined amount of tickets. Additionally, if the script determines that the toner level of the local printer is sufficient enough to print the predetermined amount of tickets, the script returns the local printer. Otherwise, the script provides an identifier of the nearest printer having a toner level sufficient enough to print the predetermined amount of tickets. In some embodiments, the administrator 212 may submit the script within a value field 404(1) of the GUI 400. In some other embodiments diminish at 212 may provide a filename of a file including the script within the value field 404(1) of the GUI 400. In yet still some other embodiments, the GUI 400 may include pre-configured scripts that the administrator may select within the value fields 404.

In addition, the administration module 242 may send configuration selection information 230 including the device identifier 218(1) of the client device 204(1), the configuration setting 236(1) corresponding to the default printer, and the configuration value 246(1) corresponding to the script.

In 606, the management server may generate configuration information including a mapping of the configuration setting to the dynamic configuration value. For example, the configuration management service 222 may receive the configuration selection information 230. Further, the configuration management service 222 may generate the configuration information 226 based upon the configuration selection information 230. In some embodiments, the configuration information 226 includes instructions causing the client device 204(1) to set the configuration setting 236(1) corresponding to the default printer to the configuration value 246(1) corresponding to the script.

In 608, the management server may receive a configuration information request including an identifier associated with the remote client device. For example, the client device 204(1) may determine that it has connectivity to the management server 208. In response, the client service 240(1) may send the configuration request 266(1) including the device identifier 218(1) to the management server 208.

As an example, the client device 204 (1) may be powered on, and attempt to communicate with a network address associated with the management server 208. In addition, if the client device 204(1) determines that it capable of communicating with the management server 208, the client device 204(1) may send the configuration request 266(1) to the management server 208.

In 610, the management server may send the configuration information to a configuration device. For example, the management server 208 may send the configuration information 230 to the client device 204(1). Upon receipt of the configuration information 226, the client service 240 may configure the client device 204(1) based on the configuration information 2226. For instance, the client service 240 may execute the script, and set the printer identified by the script as the default printer for the client device 204(1).

Figure 7:
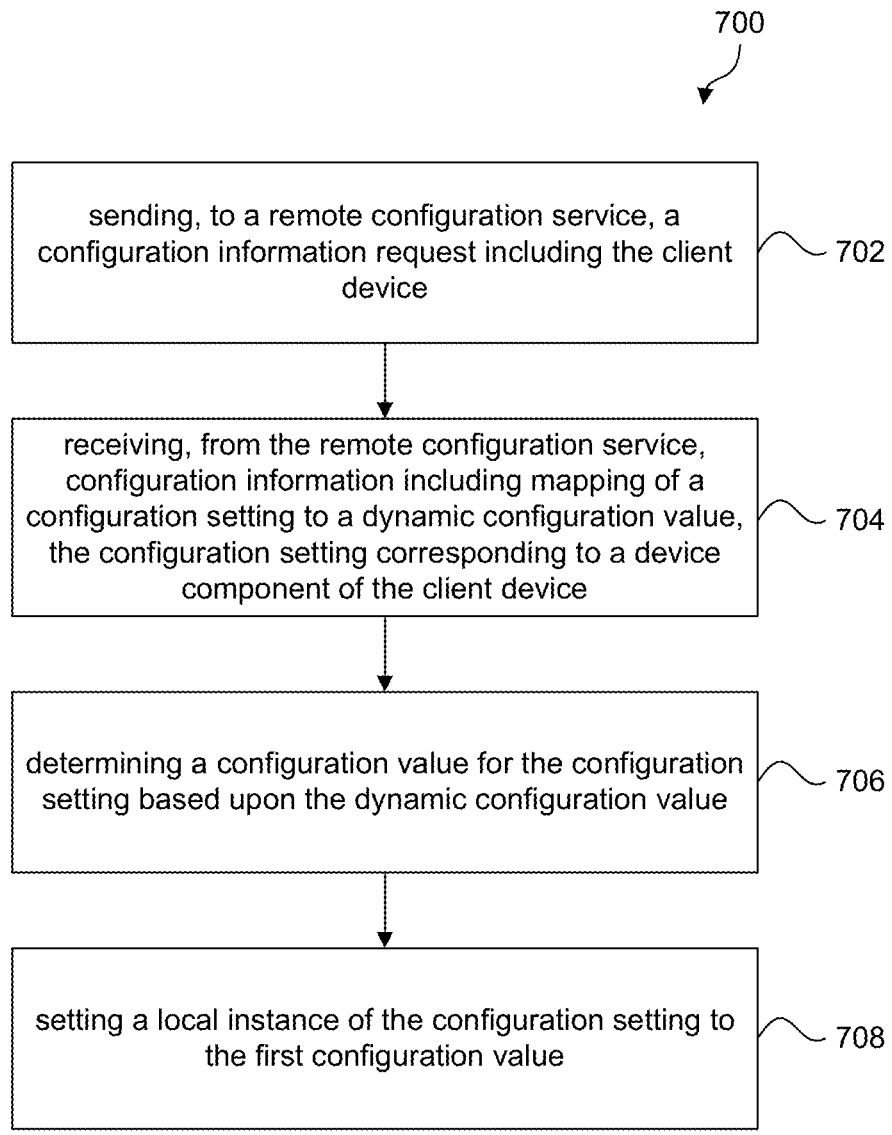
FIG. 7 is a flowchart illustrating a process for implementing zero touch deployment and dynamic configuration in a managed device system, according to some embodiments.

FIG. 7 is a flowchart for a method 700 for implementing zero touch deployment and dynamic configuration in a managed device system, according to an embodiment. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIGS. 2 and 4. However, method 700 is not limited to that example embodiment.

In 702, the client device may send, to a remote configuration service, a configuration information request including the client device. For example, the client device 204(1) may determine that it has network connectivity to the management server 208. In response, the client service 240(1) may send the configuration request 266(1) including the device identifier 218(1) to the management server 208.

As an example, the client device 204 (1) may be powered on, and attempt to communicate with a network address associated with the management server 208. In addition, if the client device 204(1) determines that it capable of communicating with the management server 208, the client device 204(1) may send the configuration request 266(1) to the management server 208.

In 704, the client device may receive, from the remote configuration service, configuration information including mapping of a configuration setting to a dynamic configuration value, the configuration setting corresponding to a device component of the client device. For instance, the client device 204(1) may receive the configuration information 226 from the management server 208. Further, the configuration information 226 may include instructions that cause the client device 204(1) to set a configuration setting 236 to a configuration value 246. Further, the configuration information 226 may include instructions a mapping of a configuration setting 236 that identifies a default printer for the client device 204(1) to a configuration value 246 including a script for determining the closest printer having a predetermined amount of toner.

In 706, the client device may determine a configuration value for the configuration setting based upon the dynamic configuration value. For instance, the client service 240(1) may evaluate the configuration value 246(1). In some embodiments, evaluating the configuration value 246(1) may include injecting a variable value 250 into an expression, evaluating an expression, and/or executing a script. For example, the client service 240(1) may execute the script included in the configuration value 246 to determine the closest printer having a predetermined amount of toner.

In 708 the client device may set a local instance of the configuration setting to the first configuration value. For instance, upon receipt of the configuration information 230, the client service 240 may configure the client device 204(1) based on the configuration information 230. For example, the client service 240 may set the printer identified by the script as the default printer for the client device 204(1).

Figure 8:
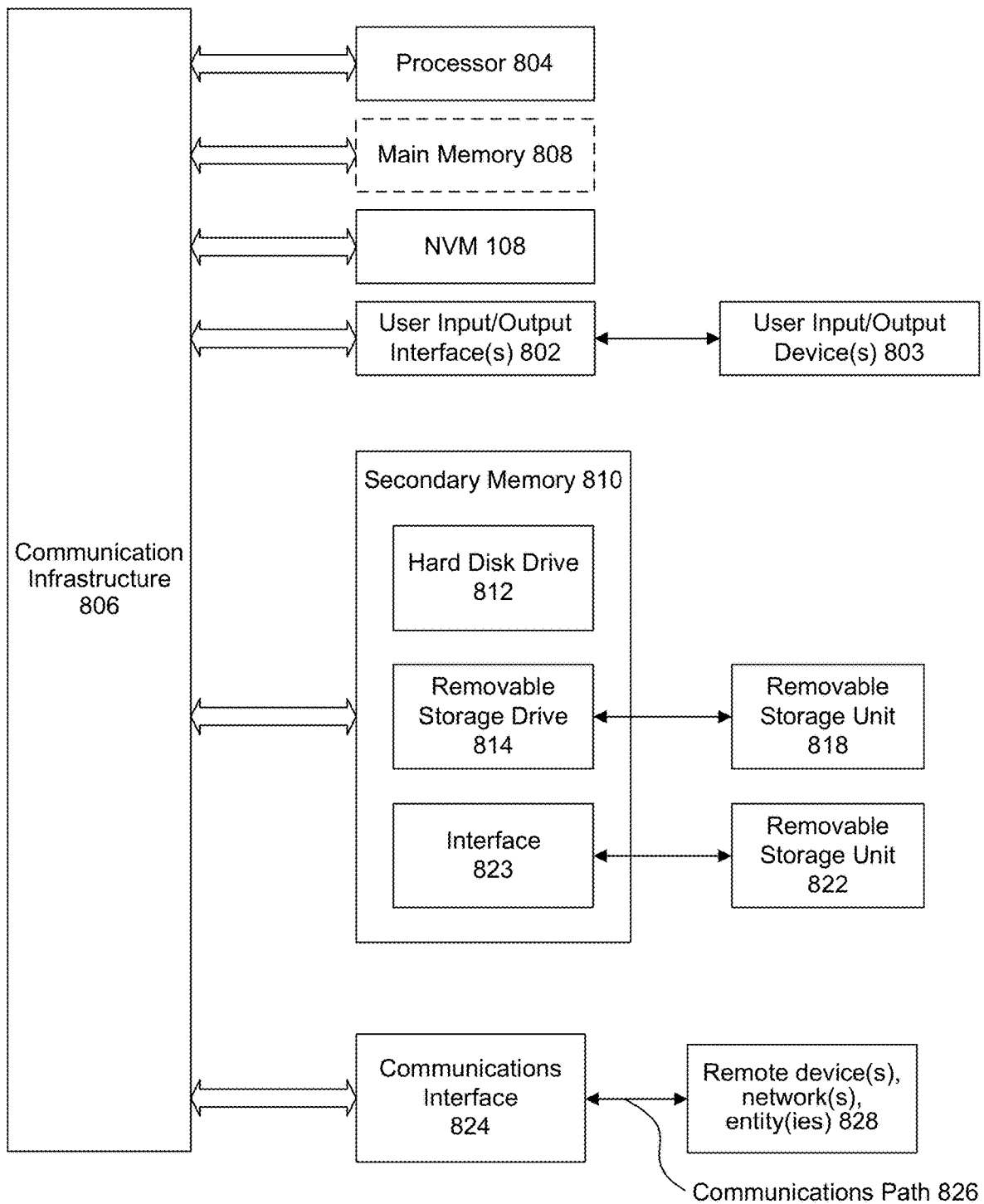
FIG. 8 is an example computer system useful for implementing various embodiments.

Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 803, such as monitors, touch-sensitive displays, card reader devices, microphones, cameras, motion sensors, digital dance pads, gesture recognition devices, location sensors, NFC reader devices, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing device applications and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
   determining, by a management server, a configuration setting corresponding to a device component associated with a remote client device;
   receiving, by the management server and from an administrator device, a dynamic configuration value for the configuration setting via a configuration management service at the management server;
   generating, by the management server, configuration information including a mapping of the configuration setting to the dynamic configuration value;
   receiving, by the management server, a configuration information request including an identifier associated with the remote client device;
   sending, by the management server, the configuration information to the administrator device, wherein the configuration information is configured to be provided to the remote client device by the administrator device; and
   receiving, from the administrator device via the configuration management service, a configuration variable assignment including a variable identifier and a variable value, wherein the dynamic configuration value includes the variable value.

2. The method of claim 1, wherein the dynamic configuration value configures the remote client device to:
   disable or limit a physical interface of the remote client device based upon a connectivity of the remote client device to a device peripheral; or
   disable or limit an application installed on the remote client device based upon the connectivity of the remote client device to the device peripheral.

3. The method of claim 1, wherein the dynamic configuration value includes a script executable by an operating system or application of the remote client device.

4. The method of claim 1, wherein generating the configuration information comprises:
   determining an expected type of the configuration setting; and
   validating the dynamic configuration value based on the expected type.

5. The method of claim 1, wherein sending the configuration information to the administrator device comprises:
   generating a readable identifier based on the configuration information; and
   sending the readable identifier to the administrator device associated with an administrator of the remote client device.

6. The method of claim 1, wherein the device component is an application, and determining the configuration setting corresponding to the device component comprises:
   identifying the configuration setting in metadata associated with an installation package associated with the application.

7. The method of claim 1, wherein determining the configuration setting corresponding to the device component comprises:
   identifying that the configuration setting is associated with other remote client devices including the device component.

8. The method of claim 1, wherein the device component includes at least one of an operating system, an application, or a peripheral device.

9. The method of claim 1, wherein the configuration setting includes at least one of authorized content, authorized applications, application settings, authorized peripheral devices, permitted device operations, usage restrictions, brightness settings, contrast settings, screen resolution, speaker activation, volume control, reboot information, shutdown information, user-defined settings, or network configuration.

10. A client device comprising:
a touch-sensitive display;
a memory including a client device identifier; and
one or more processors and/or circuits coupled to the touch-sensitive display and the memory and configured to:
send, to a remote configuration service at a management server, a configuration information request including the client device identifier;
receive, from an administrator device, a readable identifier responsive to sending the configuration information request;
determine, based on the readable identifier, configuration information including mapping of a configuration setting to a dynamic configuration value, the configuration setting corresponding to a client device component, wherein the dynamic configuration value includes a script executable by an operating system or application of the client device;
determine, responsive to an event at the client device, a configuration value for the configuration setting based upon the dynamic configuration value;
set, at the client device and without user input at the client device, a local instance of the configuration setting to the configuration value.

11. The client device of claim 10, wherein the client device component includes at least one of an operating system, an application, or a peripheral device and the event at the client device comprises a device peripheral connected to the client device or disconnected from the client device.

12. The client device of claim 10, wherein the configuration setting includes at least one of authorized content, authorized applications, application settings, authorized peripheral devices, permitted device operations, usage restrictions, brightness settings, contrast settings, screen resolution, speaker activation, volume control, reboot information, shutdown information, user-defined settings, or network configuration.

13. The client device of claim 10, wherein to determine the configuration value, the one or more processors and/or circuits are further configured to:
execute the script within a secure container environment to determine a script return value; and
determine the configuration value based upon the script return value.

14. The client device of claim 10, wherein the one or more processors and/or circuits are further configured to:
receive a configuration variable assignment including a variable identifier and a variable value, wherein the dynamic configuration value includes the variable value.

15. The client device of claim 10, wherein the configuration setting is a uniform resource locator, and the one or more processors and/or circuits are further configured to receive content from a content server corresponding to the dynamic configuration value.

16. A method for configuring a device comprising:
sending, to a remote configuration service at a management server, a configuration information request including a client device identifier;
receiving, from an administrator device, a readable identifier responsive to sending the configuration information request;
determining, based on the readable identifier, configuration information including a mapping of a configuration setting to a dynamic configuration value, the configuration setting corresponding to a device peripheral of a client device, wherein the dynamic configuration value includes a script executable by an operating system or application of the client device;
determining a first configuration value for the configuration setting based upon the dynamic configuration value and a status of the device peripheral;
setting, at the client device and without user input at the client device, a local instance of the configuration setting to the first configuration value;
monitoring a device component via a management application of the client device;
determining, by the management application, a change to the status of the device peripheral of the client device, wherein the change to the status comprises the device peripheral being disconnected from the client device;
determining a second configuration value for the configuration setting based upon the change to the status of the device component; and
updating the local instance of the configuration setting to the second configuration value.

17. The method of claim 16, further comprising a camera device, and wherein receiving the readable identifier comprises:
capturing, from a mobile device, the readable identifier via the camera device; and
identifying the configuration setting and the dynamic configuration value based on the readable identifier.

18. The method of claim 16, further comprising a personal area network (PAN) device, and wherein receiving the readable identifier comprises:
establishing a PAN with the administrator device;
receiving, from the administrator device, the readable identifier via the PAN.

19. The method of claim 16, wherein monitoring the device component comprises:
receiving status information associated with the device component from a remote device; and
determining that the device component is inaccessible via the status information.

20. The method of claim 16, wherein updating the local instance of the configuration setting comprises:
enabling, limiting, or disabling a device interface of the client device based upon connectivity of the client device to a device peripheral; or
enabling, limiting, or disabling an application installed on the client device based upon connectivity of the client device to a device peripheral.

* * * * *